United States Patent [19]

Takano et al.

[11] 4,007,684

[45] Feb. 15, 1977

[54] INK LIQUID WARMER FOR INK JET SYSTEM PRINTER

[75] Inventors: Rikuo Takano, Musashino; Yuji Sumitomo, Nara, both of Japan

[73] Assignees: Nippon Telegraph and Telephone Public Corporation, Tokyo; Sharp Kabushiki Kaisha, Osaka, both of Japan

[22] Filed: Sept. 26, 1974

[21] Appl. No.: 509,549

[30] Foreign Application Priority Data

Sept. 26, 1973 Japan .......................... 48-108778

[52] U.S. Cl. .............................. 101/366; 118/602; 346/75; 346/140 A; 338/22 R

[51] Int. Cl.² .................. B41F 31/02; G01D 15/16

[58] Field of Search .............. 101/366, 363, 350, 1; 346/140, 75, 1 R; 137/341; 118/602, 302; 338/22 R

[56] References Cited

UNITED STATES PATENTS

| | | | |
|---|---|---|---|
| 2,703,746 | 3/1955 | Colt | 346/140 |
| 2,762,652 | 9/1956 | Carter | 118/302 X |
| 2,848,353 | 8/1958 | Norris | 118/602 X |
| 3,255,689 | 6/1966 | Kielsmeier et al. | 118/602 X |
| 3,365,326 | 1/1968 | Conrad | 118/602 X |
| 3,451,374 | 6/1969 | Clausen et al. | 118/602 X |
| 3,511,693 | 5/1970 | Davidson | 118/602 X |
| 3,512,173 | 5/1970 | Damouth | 346/75 |
| 3,653,932 | 4/1972 | Berry | 346/140 X |
| 3,719,796 | 3/1973 | Abildtrup | 338/22 R X |
| 3,761,953 | 9/1973 | Helgeson et al. | 346/140 X |
| 3,787,882 | 1/1974 | Fillmore et al. | 346/75 |
| 3,803,386 | 4/1974 | Rodrigues | 338/22 R X |
| 3,831,727 | 8/1974 | Kruspe et al. | 346/140 |
| 3,851,291 | 11/1974 | Sommer | 338/22 R |
| 3,878,517 | 4/1975 | Kasubuchi et al. | 346/75 |
| 3,878,519 | 4/1975 | Eaton | 346/140 X |
| 3,885,496 | 5/1975 | Breitweg et al. | 101/366 X |
| 3,911,161 | 10/1975 | Word et al. | 427/30 |
| 3,914,772 | 10/1975 | Kashio | 346/75 |

OTHER PUBLICATIONS

IBM Tech. Discl. Bul., vol. 16, No. 10, Mar. 1974, "Two Level Ink Jet Deflection Control System," pp. 3308–3311.

IBM Tech. Discl. Bul., vol. 16, No. 10, Mar. 1974, "Viscosity Control Circuit," Ruddy, p. 3295.

*Primary Examiner*—E. H. Eickholt
*Attorney, Agent, or Firm*—Stewart and Kolasch, Ltd.

[57] ABSTRACT

In an ink jet system printer of the charge amplitude controlling type, it is required to ensure stable printing that viscosity and surface tension of ink liquid supplied to a nozzle is maintained at a constant value. To this end, there is provided an ink liquid warmer in an ink supply system. The viscosity and surface tension of the ink liquid is maintained at a constant value by holding the ink liquid at a predetermined temperature.

5 Claims, 4 Drawing Figures

INK LIQUID WARMER FOR INK JET SYSTEM PRINTER

BACKGROUND OF THE INVENTION

The present invention relates to an ink supply system in an ink jet system printer.

In general, an ink jet system printer, ink droplets from a nozzle are issued toward a recording paper, and then desired ink droplets are deflected in a desired direction when they pass through an appropriate deflection means. The deflected ink droplets are deposited on the recording paper in order to record desired symbols corresponding to printing information supplied. Especially, in an ink jet system printer of the charge amplitude controlled type wherein an ink stream from a nozzle having an ultrasonic vibrator is broken into ink droplets at a given vibration frequency, and the individual ink droplets, being charged by a charging electrode in accordance with printing information, are deflected in accordance with the amplitude of charges carried thereon as they pass through an electrostatic field of a fixed high voltage thereby printing desired symbols such as alphabet characters, it is of importance that the application of charging signals is accurately timed to be in agreement with the droplet separation phase. Therefore, it is necessary to hold the predetermined phase relationship between the droplet separation and the ultrasonic vibration substantially constant.

The ink liquid used in the ink jet system printer as set forth above undergoes changes in physical constants such as the viscosity and surface tension thereof in a fashion dependent upon the ink liquid temperature. Therefore, it is necessary to maintain the ink liquid at a predetermined temperature in order to ensure stable printing.

SUMMARY OF THE INVENTION

Accordingly, an object of the present invention is to provide an ink jet system printer which ensures stable printing.

Another object of the present invention is to provide an ink liquid supply system for use in an ink jet system printer which holds the viscosity and surface tension of the ink liquid at a constant value.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, the ink jet system printer of the present invention is provided with an ink liquid warmer in the ink supply system. The ink liquid to be supplied to the nozzle is warmed and held at a predetermined temperature, and hence the viscosity and surface tension of the ink liquid are maintained at a predetermined value in order to ensure stable printing.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Referring now in detail to the drawings, and to facilitate a more complete understanding of the present invention, the characteristics of the ink liquid used in the ink jet system printer of the present invention will be first described with reference to FIGS. 1(A) and 1(B).

Figure 1A:
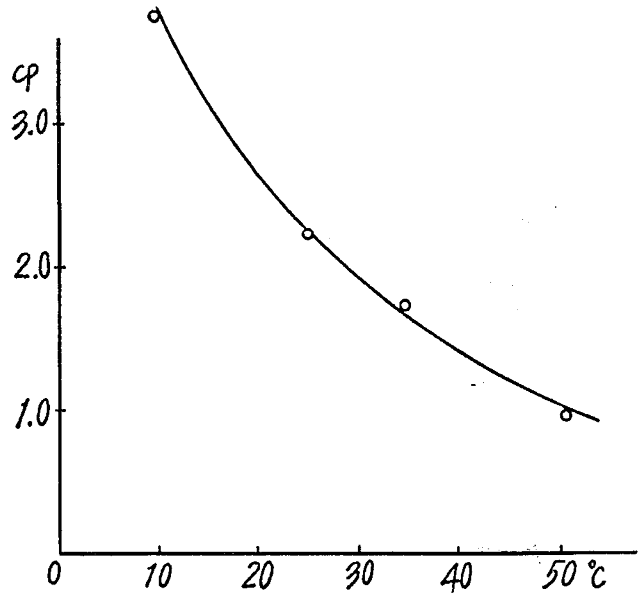
FIG. 1(A) is a graph showing viscosity versus ink liquid temperature characteristics of ink liquid used in an ink jet system printer.
Figure 1B:
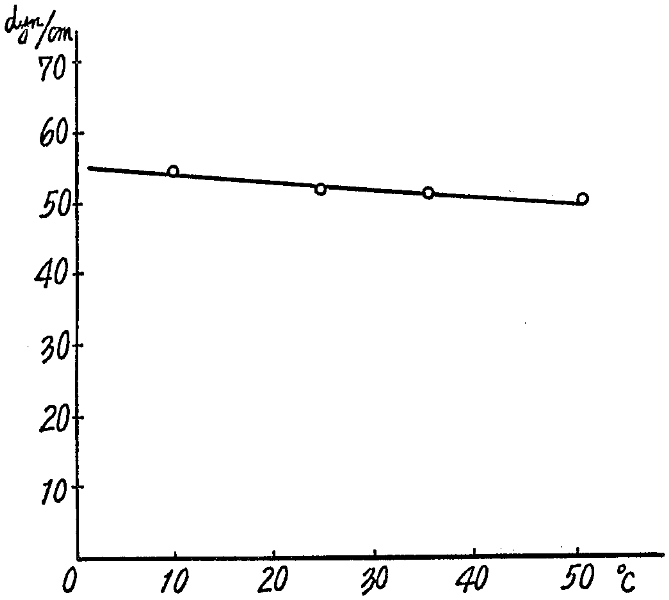
FIG. 1(B) is a graph showing surface tension versus ink liquid temperature characteristics of ink liquid used in an ink jet system printer.
Figure 2:
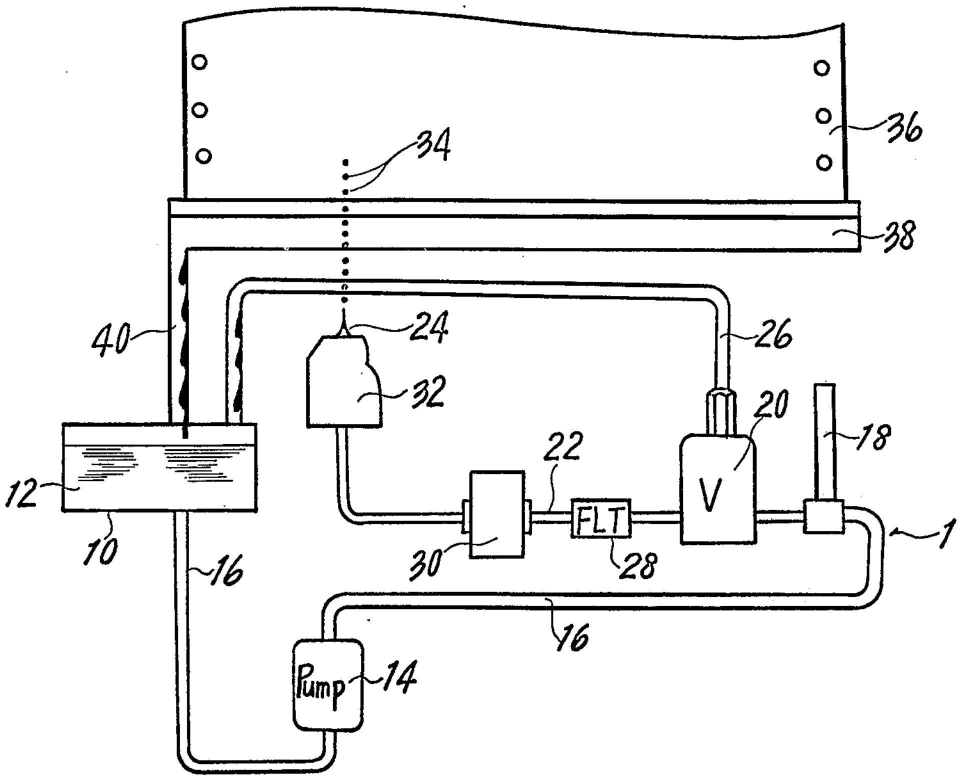
FIG. 2 is a schematic diagram showing an ink supply system embodying the present invention.

FIG. 1(A) shows the relationship between the temperature (along the abscissa axis) and the viscosity (along the ordinate axis) of the ink liquid, and FIG. 1(B) shows the relationship between the temperature (along the abscissa axis) and the surface tension (along the ordinate axis) of the ink liquid. It is clear from FIG. 1(A) that the viscosity of the ink liquid reduces by several tens percent when the liquid temperature increases from 10° to 50° C. A tip of a nozzle, which issues the ink liquid, is usually constituted by a capillary tube of 50 – 80 um in diameter, and therefore the fluid resistance of the ink liquid passing therethrough is greatly influenced by the viscosity of the ink liquid. As the fluid resistance changes, the amount of the ink liquid issuing from the nozzle changes and hence the shade of the printed character may vary. Moreover, the ink droplet separation phase will change as the viscosity of the ink liquid changes, and the change of the ink droplet separation phase may preclude accurate printing. It is also clear from FIG. 1(B) that the surface tension of the ink liquid gradually reduces as the ink liquid temperature increases. The surface tension of the ink liquid also greatly influences the ink droplet separation phase. It can be concluded that the viscosity and surface tension of the ink liquid to be supplied to the nozzle must be maintained at a constant value in order to ensure stable printing, or, in other words, the ink liquid must be held at a predetermined temperature without regard to ambient temperature conditions in order to perform accurate printing. Referring now to FIG. 2, there is illustrated an ink supply system 1 of the present invention including an ink liquid warmer 30 within the ink supply system. Ink liquid 12 contained within an ink reservoir 10 is sent under pressure to an ink supply system 1 through a pump 14 and a conduit 16. An outlet side of the pump 14 is connected to an air chamber 18 to remove the pressure pulsation caused by the pump 14.

An electromagnetic cross valve 20 is provided for controlling the supply direction of the ink liquid 12. The ink liquid 12 is supplied from the pump 14 to a nozzle 24 through the conduit 16 and a conduit 22 when the printing operation is performed, and the ink liquid 12 is returned from the nozzle 24 and conducted to the ink reservoir 10 through the conduits 22 and 26 when the ink jet printer ceases its operation. A rapid ink stream or pulse returning from the nozzle 24 to the electromagnetic cross valve 20 occurring at the time of termination of the printing operation tends to blow out or clean filter 28.

For example, the coil of the electromagnetic cross valve 20 is activated in order to connect the nozzle 24 with the pump 14, when the system is in an operative condition or the main power switch is ON. While if the coil of the electromagnetic cross valve 20 is disabled (when the main power switch of the system is off), the nozzle 24 is connected with the ink reservoir 10 through the conduit 26.

The filter 28 is provided for removing impurities included within the ink liquid 12 to be supplied to the nozzle 24 in order to prevent the capillary tube portion of the nozzle 24 from becoming blocked with said impurities. The reference number 30 represents an ink liquid warmer of the present invention, which holds the ink liquid 12 to be supplied to the nozzle 24 at a predetermined temperature without regard to the temperature condition of the ink supply system 1 or ambient conditions outside of the ink jet system printer, etc., in order to ensure stable printing. The detailed construction of the ink liquid warmer 30 will be described in detail hereinafter.

The nozzle 24 is held by an ink droplet issuance unit 32 including an electromechanical transducer such as a piezovibrator of a type well known in the art. The ink liquid 12 issuing from the nozzle 24 is excited by the electro-mechanical transducer so that ink droplets 34 of a frequency equal to the exciting signal frequency are formed. Charging signals corresponding to the printing information are applied to a charging electrode (not shown) and are timed in agreement with the ink droplet separation phase in order to change the individual ink droplets with the charge amplitude corresponding to the printing information in a manner well known in the art. As the ink droplets 34 charged with the charging signals passing through a high voltage electric field established by a pair of high voltage deflection plates (not shown), droplets 34 are deflected in accordance with the amplitude of charges on the droplets and deposited on a recording paper 36 to print a desired pattern. The ink droplets not contributive to writing operation are neither charged nor deflected and are directed toward a beam gutter 38 in order to recirculate the waste ink liquid to the ink reservoir 10 through a conduit 40.

Figure 3:
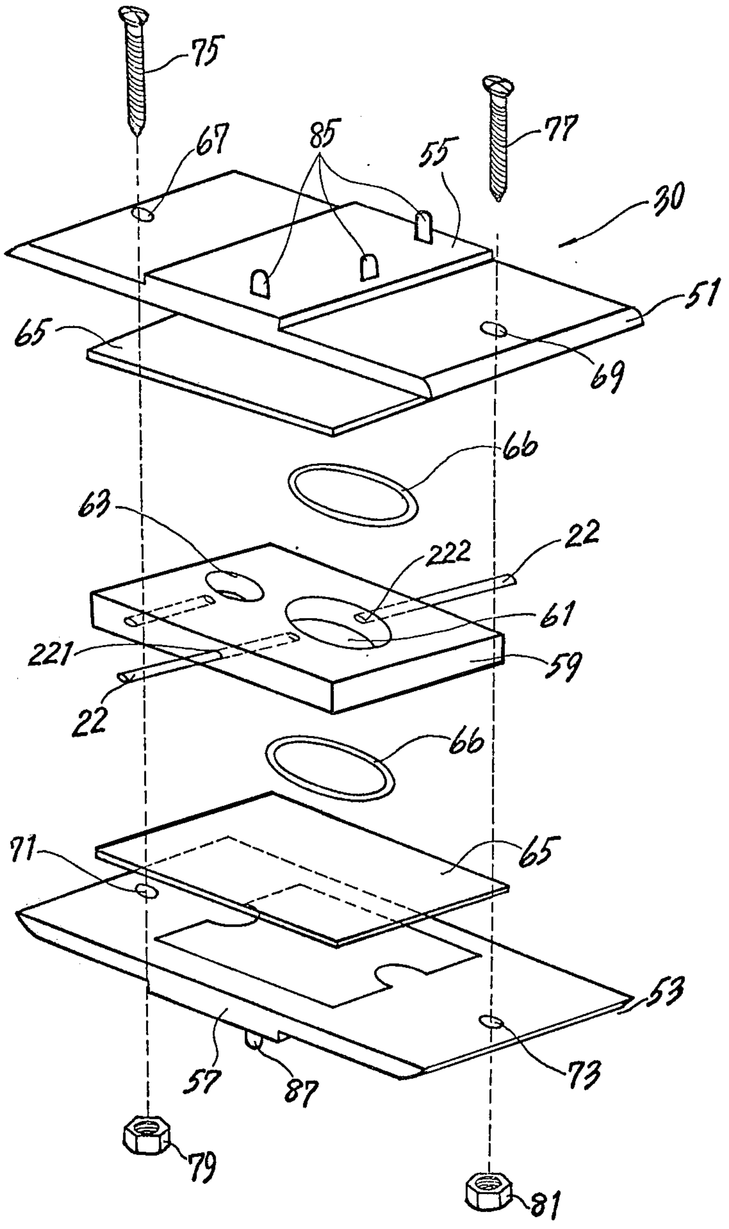
FIG. 3 is an exploded perspective view of an embodiment of an ink liquid warmer of the present invention.

FIG. 3 is an exploded perspective view showing an embodiment of the ink liquid warmer 30.

Positive characteristic thermistors 55 and 57 any type known in the art coated with insulating materials are provided within an upper cover 51 and a bottom cover 53 respectively, for serving as heat sources. The ink liquid is warmed up to a predetermined temperature in a few seconds since the positive characteristic thermistors generate heat with fast rise times. A metallic block 59 having an ink liquid inlet 221 and an ink liquid outlet 222 is provided for supporting the ink liquid in the ink liquid warmer 30, the ink liquid inlet 221 and the ink liquid outlet 222 being connected to the conduit 22, respectively. There is provided a cavity 61 in the metallic block 59 for detaining the ink liquid. Since the cavity 61 is made considerably large in size, the ink liquid 12 flows slowly in the cavity 61 with respect to the rate of flow of ink liquid in conduit 22. Therefore, the ink liquid is detained in the cavity 61 for a considerably long time for heat exchange. A compartment 63 is provided in the metallic block 59 for containing a thermo-sensitive element such as thermistor which serves as a protective means for preventing the warmer device from being overheated or serves as a temperature controller.

The positive characteristic thermistors 55 and 57 illustrated in FIG. 3 maintain the ink liquid at a predetermined temperature, for example, between 40°–60° C. The thermistors 55 and 57 are very stable temperature devices and, therefore, maintain the predetermined temperature on their own.

The thermosensitive element in compartment 63 is provided for the purpose of preventing the warmer device of FIG. 3 from overheating. In a typical example, the thermosensitive element is a fuse which may be connected between the positive characteristic thermistors 55 and 57 and a power source therefor. In the case where the heat source comprises a resistor such as a tungsten wire or means other than the thermistors, the thermosensitive element in compartment 63 must function as a control means to maintain the resistor or the ink liquid at a predetermined temperature.

Inner metallic covers 65 are provided for supporting the metallic block 59. "O" shaped rings 66 are interposed between the metallic block 59 and the inner metallic covers 65 respectively, in a manner to surround the cavity 61 thereby preventing the ink liquid from leaking. The ink liquid warmer 30 is fixed by bolts 75 and 77, and nuts 79 and 81 through holes 67, 69 provided at appropriate positions of the upper cover 51 and holes 71, 73 provided at corresponding positions of the bottom cover 53. The two positive characteristic thermistors 55 and 57 are, for example, connected in a parallel relation to each other and then to a power source with the use of terminals 85 and 87.

The above-mentioned metallic block 59, inner metallic covers 65, upper cover 51 and bottom cover 53 must be made of material of a low heat capacity. Also the heat sources may also comprise a resistor such as a tungsten wire instead of positive characteristic thermistors.

By employing the ink liquid warmer 30 within the ink supply system 1, stable printing is ensured. Moreover the preheating time required for warming up and preparing the system for conditions suited for stable printing is reduced. In the case where the ink jet system printer is used as a data transmission terminal unit, the printing operation must be suppressed until the system reaches a stable condition after power supply to the printer in response to the instruction from the central office. The printing suppression time approximately equals the preheating time. The preheating time for the ink jet system printer of the present invention is a few seconds since the ink liquid warmer 30 is provided within the ink supply system 1.

The ink liquid 12 is emitted from the tip of the nozzle 24 toward the recording paper 36 as a solid stream of 1 – 3 cm length, and then separates into droplets 34. The length, and then separates into droplets 34. The length of the solid stream varies in accordance with the viscosity and surface tension of the ink liquid, and the variation of the length of the solid stream varies the droplet separation phase and makes the printer unstable. Therefore, in the present invention, the ink liquid 12 is warmed in a manner to stabilize the length of the solid stream and the droplet separation phase.

The invention being thus described, it will be obvious that the same way be varied in many ways. Such variations are not to be regarded as a departure from the spirit and scope of the invention, and all such modifications are intended to be included within the scope of the following claims.

What is claimed is:

1. In an ink liquid supply system for an ink jet system printer of the charge amplitude controlling type which emits ink droplets from a nozzle toward a recording paper, selectively deflects said ink droplets by a deflection means, and prints desired symbols on said recording paper with said deflected ink droplets, said ink liquid supply system being provided with an ink liquid reservoir for containing the ink liquid therein, conduit means for connecting said ink liquid reservoir with said nozzle and means for supporting ink liquid through said conduit to said nozzle, the improvement which comprises warmer means for warming the ink in said ink supply system to a predetermined temperature in order to stabilize the viscosity and surface tension of said ink liquid supplied to said nozzle, said warmer means being disposed in the path of said conduit means and comprising cavity means for detaining ink liquid therein, inlet means coupled to said conduit means for introducing ink liquid into said cavity means and outlet means coupled to said conduit means for permitting the flow of ink liquid from said cavity means, wherein said cavity means, inlet means, and outlet means are formed in a substantially flat block and said block is sandwiched between a pair of plates, each of said plates containing heater means.

2. The supply system of claim 1 wherein said block further includes a compartment therein adjacent said cavity means for containing a temperature controller.

3. In an ink liquid supply system for an ink jet system printer of the charge amplitude controlling type which emits ink droplets from a nozzle toward a recording paper, selectively deflects said ink droplets by a deflection means, and prints desired symbols on said recording paper with said deflected ink droplets, said ink liquid supply system being provided with an ink liquid reservoir for containing the ink therein, conduit means for connecting said ink liquid reservoir with said nozzle and means for supplying ink liquid through said conduit to said nozzle, the improvement which comprises warmer means disposed in the path of said conduit means for warming the ink in said ink supply system to a predetermined temperature in order to stabilize the viscosity and surface tension of said ink liquid supply to said nozzle, said warmer means comprising cavity means for detaining ink liquid therein, inlet means coupled to said conduit means for introducing ink liquid into said cavity means, outlet means coupled to said conduit means for permitting the flow of ink liquid from said cavity means and positive characteristic thermistor means adjacent said cavity means for warming the ink liquid in said cavity means.

4. In an ink liquid supply system for an ink jet system printer of the charge amplitude controlling type which emits ink droplets from a nozzle toward a recording paper, selectively deflects said ink droplets by a deflecting means, and prints desired symbols on said recording paper with said deflected ink droplets, said ink liquid supply system being provided with an ink liquid reservoir for containing the ink therein, conduit means for connecting said ink liquid reservoir with said nozzle, and means for supplying ink liquid through said conduit to said nozzle, the improvement which comprises warmer means disposed in the path of said conduit means for warming the ink in said ink supply system to a predetermined temperature in order to stabilize the viscosity and surface tension of said ink liquid supply to said nozzle, and valve means disposed in said conduit means and additional conduit means connecting said valve means with the ink reservoir, said valve means selectively directing the flow of ink liquid from said ink reservoir to said nozzle or from said nozzle to said ink reservoir and filter means disposed in said conduit means between said nozzle and said valve means.

5. In an ink liquid supply system for an ink jet system printer of the charge amplitude controlling type wherein an ink stream emitted from a nozzle having an ultrasonic vibrator is broken into ink droplets at a given vibration frequency, and the individual ink droplets, being charged by a charging electrode in accordance with printing information, are deflected in accordance with the amplitude of charges carried thereon as they pass through an electrostatic field of a fixed high voltage, thereby printing desired symbols on a recording paper, said ink liquid supply system being provided with an ink liquid reservoir for containing the ink liquid therein, conduit means for connecting said ink liquid reservoir with said nozzle, and means for supplying ink liquid through said conduit to said nozzle, the improvement which comprises warmer means for warming the ink in said ink supply system to a predetermined temperature in order to stabilize the viscosity and surface tension of said ink liquid supplied to said nozzle and for maintaining the phase relationship between the droplet separation and the ultrasonic vibration substantially constant, said warmer means being provided for warming said ink and being disposed in the path of said conduit means, valve means disposed in said conduit means, additional conduit means connecting said valve means with the ink reservoir, said valve means selectively directing the flow of ink liquid from said ink reservoir to said nozzle or from said nozzle to said ink reservoir, and filter means disposed in said conduit means between said nozzle and said valve means.

* * * * *